United States Patent [19]

Izumiya et al.

[11] Patent Number: 5,504,294

[45] Date of Patent: Apr. 2, 1996

[54] METHOD FOR CONTROLLING A WIRE-CUT ELECTRIC DISCHARGE MACHINE

[75] Inventors: Syunzo Izumiya, Fujiyoshida; Toshiro Tsutsumi, Oshino; Izumi Higashi, Oshino; Yuki Kita, Oshino; Tomonobu Sakuragawa, Oshino, all of Japan

[73] Assignee: Fanuc Ltd., Yamanashi, Japan

[21] Appl. No.: 133,198

[22] PCT Filed: Feb. 23, 1993

[86] PCT No.: PCT/JP93/00220

§ 371 Date: Oct. 20, 1993

§ 102(e) Date: Oct. 20, 1993

[87] PCT Pub. No.: WO93/16834

PCT Pub. Date: Sep. 2, 1993

[30] Foreign Application Priority Data

Feb. 25, 1992 [JP] Japan .................. 4-073277

[51] Int. Cl.$^6$ .................. B23H 1/00; B23H 7/02
[52] U.S. Cl. .................. 219/69.12
[58] Field of Search .................. 219/69.12, 69.14, 219/69.17, 69.13

[56] References Cited

U.S. PATENT DOCUMENTS

| | | | |
|---|---|---|---|
| 4,510,366 | 4/1985 | Inoue | 219/69.12 |
| 4,581,513 | 4/1986 | Obara et al. | 219/69.12 |
| 4,607,149 | 8/1986 | Inoue | 219/69.12 |
| 5,122,630 | 6/1992 | Reynier et al. | 219/69.12 |
| 5,177,082 | 5/1992 | Bosson et al. | 219/69.12 |
| 5,410,117 | 4/1995 | Reynier et al. | 219/69.12 |

FOREIGN PATENT DOCUMENTS

| | | |
|---|---|---|
| 151645 | 8/1985 | European Pat. Off. . |
| 378278 | 7/1990 | European Pat. Off. . |
| 62-88515 | 4/1987 | Japan . |
| 2-205413 | 8/1990 | Japan . |
| 2169536 | 7/1986 | United Kingdom . |

OTHER PUBLICATIONS

Translation of Japan Patent Document No. 62–88515, PTO–94–4721, Sep. 1994.

*Primary Examiner*—Geoffrey S. Evans
*Attorney, Agent, or Firm*—Staas & Halsey

[57] ABSTRACT

A method of controlling a wire-cut electric discharge machine to improve machining accuracy in a machining operation for a corner portion of a workpiece to be machined. In a case where the portion to be machined includes a corner, a pressure and/or an amount of machining fluid supplied to a gap between the workpiece and a wire electrode is decreased only in a specified section. The setting of this specified section and adjustment of the machining fluid is carried out on the basis of an allowable discrepancy amount, and shape and size of the corner. Furthermore, in addition to decreasing electric discharge energy supplied between the workpiece and the wire electrode, the machining fluid may be adjusted within the specified region.

8 Claims, 8 Drawing Sheets

METHOD FOR CONTROLLING A WIRE-CUT ELECTRIC DISCHARGE MACHINE

BACKGROUND OF THE INVENTION

1. Field of the Invention

The present invention relates to a method for controlling a wire-cut electric discharge machine, and more particularly, to a control method for machining a corner of the workpiece.

2. Description of the Related Art

A wire-cut electric discharge machine generates an electric discharge between its wire electrode and a workpiece, and cuts the workpiece into a desired shape by shifting the wire electrode with respect to the workpiece according to a machining command data.

Figure 1:
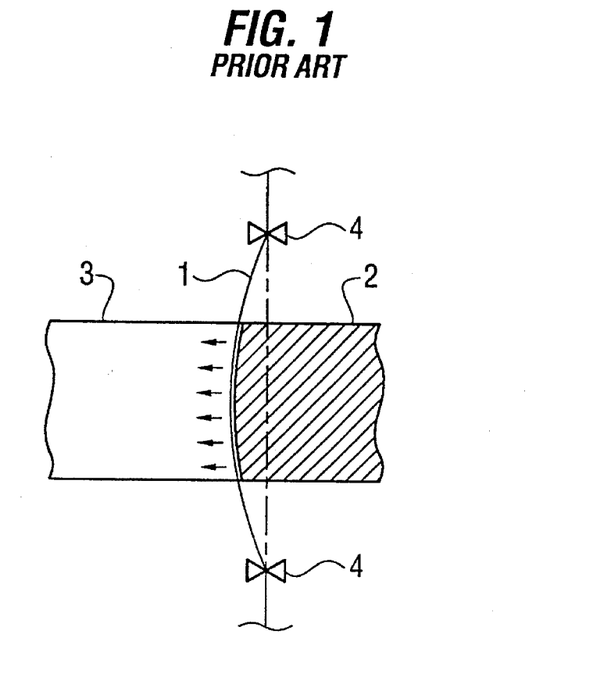
FIG. 1 (PRIOR ART) is a view illustrating a wire electrode deflected during a wire-cut electric discharge machining operation.

As shown in FIG. 1 (PRIOR ART), when the wire electrode 1 moves in a predetermined direction (i.e. a right direction in FIG. 1) for forming a slit 3 on a workpiece 2, a pressure is usually generated between the wire electrode 1 and the workpiece 2 due to electric discharge, thereby causing the wire electrode 1 to be bent backward or in a direction of the arrow S, i.e. a direction opposite to the direction of movement. For this reason, the wire electrode 1 is bent or curved backward with respect to a straight line connecting a pair of wire guides 4 and 4.

Figure 2A:
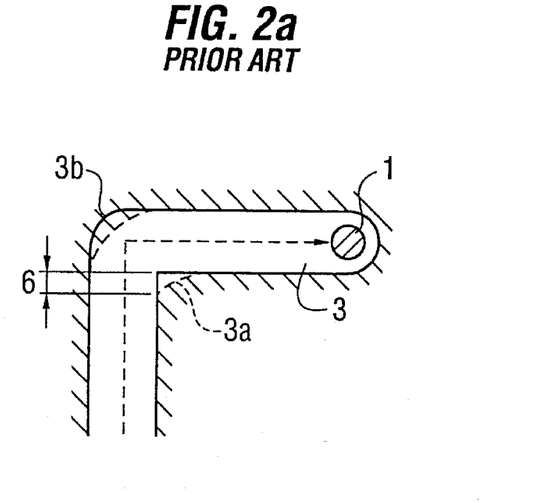
FIGS. 2a (PRIOR ART) and 2b (PRIOR ART) are views respectively illustrating discrepant portion of a machined shape in the corner machining operation.

In the case of a straight-line machining operation, this deflection will not substantially affect the machining accuracy for the worse. However, in order to form a corner, the electrode 1 needs to change its direction of movement in accordance with a machining command, for example, in a normal direction as shown in FIG. 2a (PRIOR ART). In such a corner formation, the slit 3 having a profile as indicated by a solid line 3b is not formed. An electric discharging portion of the wire electrode 1 is drawn towards an inside of the corner because of the above deflection of the wife electrode 1, to cause a discrepancy from the desired profile, as indicated by a dotted line 3a. An amount of such discrepancy is given as δ.

Figure 2B:
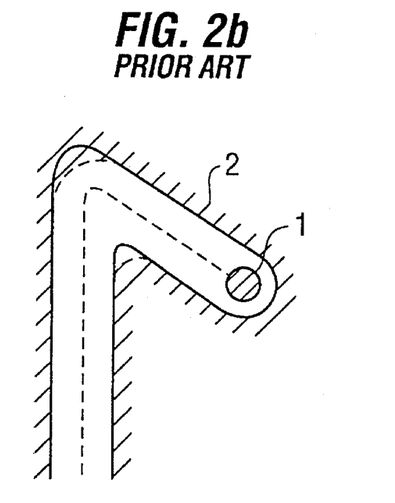

Furthermore, as shown in FIG. 2b (PRIOR ART), a similar discrepancy will occur in an arc-shaped corner in the case where a straight-line machining operation is followed by an arc machining operation.

It is known that the problem of discrepancy, such as one occurring when a straight-line machining operation is followed by another straight-line machining operation differing in the direction, or when a straight-line machining operation transfers to an arc machining operation, as is discussed in the foregoing, can be solved to a certain extent by changing the conditions of an electric discharge at the corner. For example, the on-off interval of pulse current supplied can be varied during the corner machining operation so that an electric discharge energy supplied between the wire electrode and the workpiece can be reduced to reduce the deflection of wire and resulting discrepancy of the corner.

Moreover, in wire-cut electric discharge machining, a highly-pressurized machining fluid is usually jetted against the wire electrode in the machined slit from upper and lower sides of the workpiece to remove machining chips and cool down an electrically heated portion. Hence, this machining fluid becomes another cause of the deflection of the wire electrode in the corner machining operation, thereby weakening the above-described corner discrepancy preventive effect due to the control of the discharge energy.

SUMMARY OF INVENTION

According to the present invention, a specified section is designated in a corner of a portion to be machined when the corner has an arc shape or formed with two straight lines intersecting with each other. A pressure and/or an amount of the machining fluid is controlled to be lower than those of an ordinary straight-line machining operation only within this specified section so that deflection amount of the wire electrode can be suppressed to or below a predetermined value when the wire electrode is moving within the specified section.

Furthermore, in addition to the pressure and/or amount of the machining fluid, an electric discharge energy supplied between the wire electrode and the workpiece is controlled to be lower than those in an ordinary straight-line machining operation only within this specified section.

The specified section is designated on the bases of the shape and size of the corner. Furthermore, the degree of adjustment of the machining fluid pressure and/or supply amount, as well as the same of electric discharge energy supplied, are determined in accordance with the shape and size of the corner.

DETAILED DESCRIPTION OF THE PREFERRED EMBODIMENTS

Figure 6:
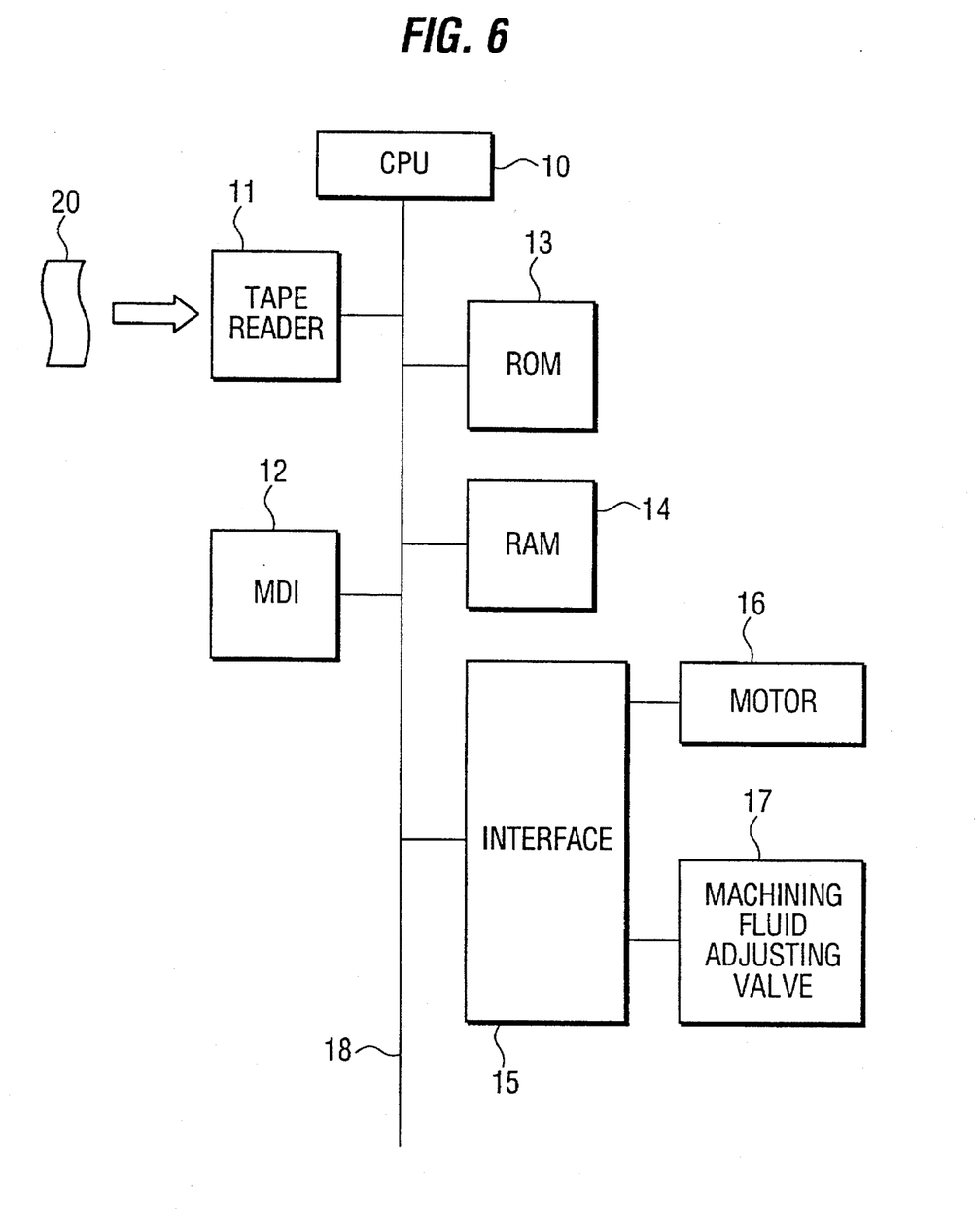
FIG. 6 is a schematic block diagram showing essential components of an NC control apparatus for a wire-cut electric discharge machine embodying the present invention.

A wire-cut electric discharge machine carrying out the method of the present invention is designed to perform its machining operation by moving the wire electrode, whose feed operation is servo-controlled by an NC apparatus, with respect to the workpiece. FIG. 6 is a block diagram showing essential components of the NC control apparatus. In FIG. 6, a central processing unit (CPU) 10 is connected via a bus 18 to the components such as a tape reader 11 for reading machining command data stored in NC tape 20, a manual data input device (MDI) 12 for inputting machining conditions such as thickness and feed speed of a workpiece, a ROM 13 for storing a control program, a RAM 14 for storing various set values, and an interface circuit 15. The interface circuit 15 is connected to a servo motor 16 for shifting the workpiece mounting base and an electromagnetic valve 17 for adjusting jetting or supply rate of machining fluid.

According to the present invention, when the portion to be machined is a corner including an arched portion or a corner including two intersecting straight lines, supply pressure and supply rate of the machining fluid is reduced lower than that applicable to the machining of the straight portion for the machining of the portion within specified region. Such specified region will be explained with reference to FIGS. 3, 4 and 5.

Figure 3:
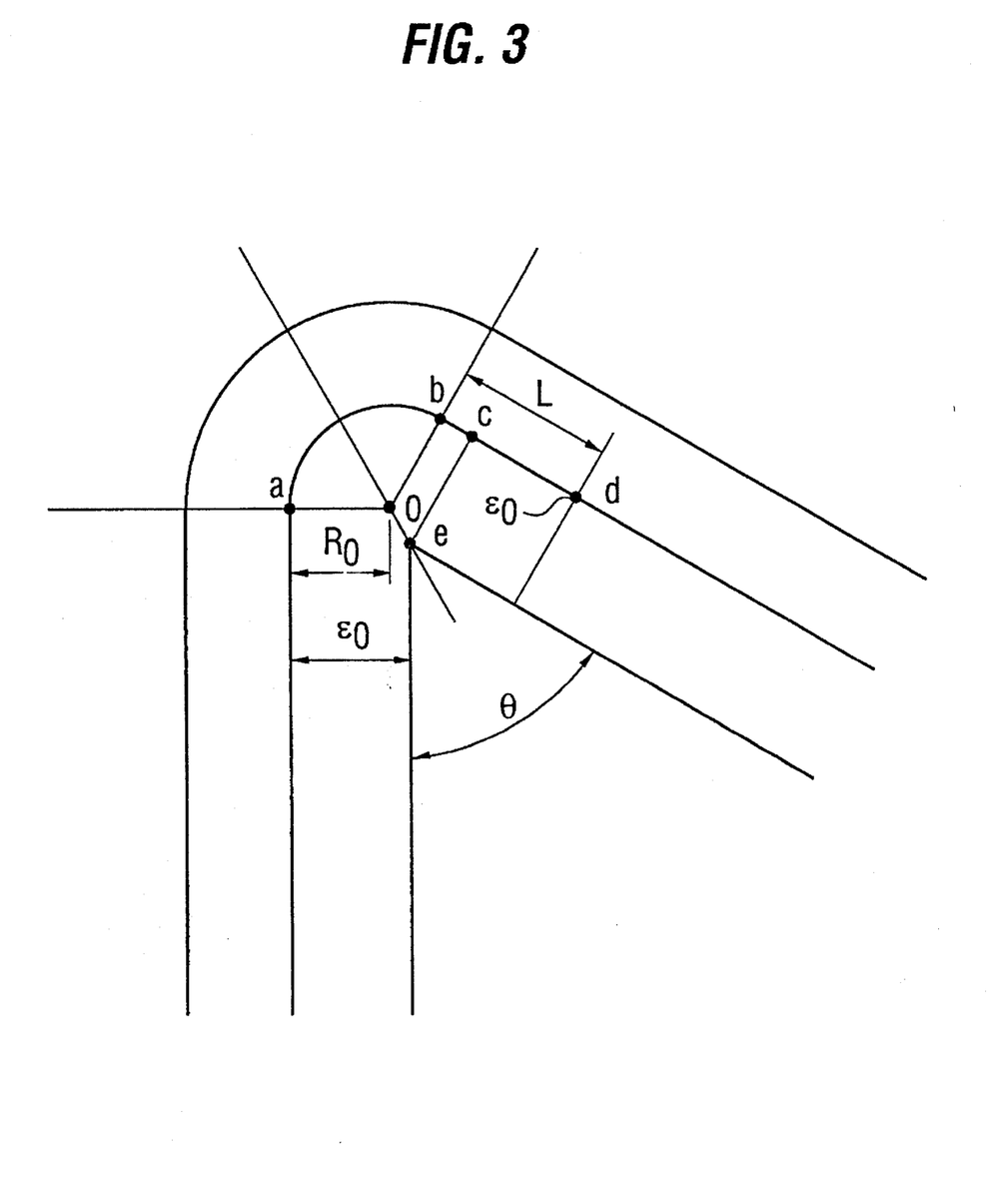
FIG. 3 is a schematic view showing a machined portion including a small-arced corner.
Figure 4:
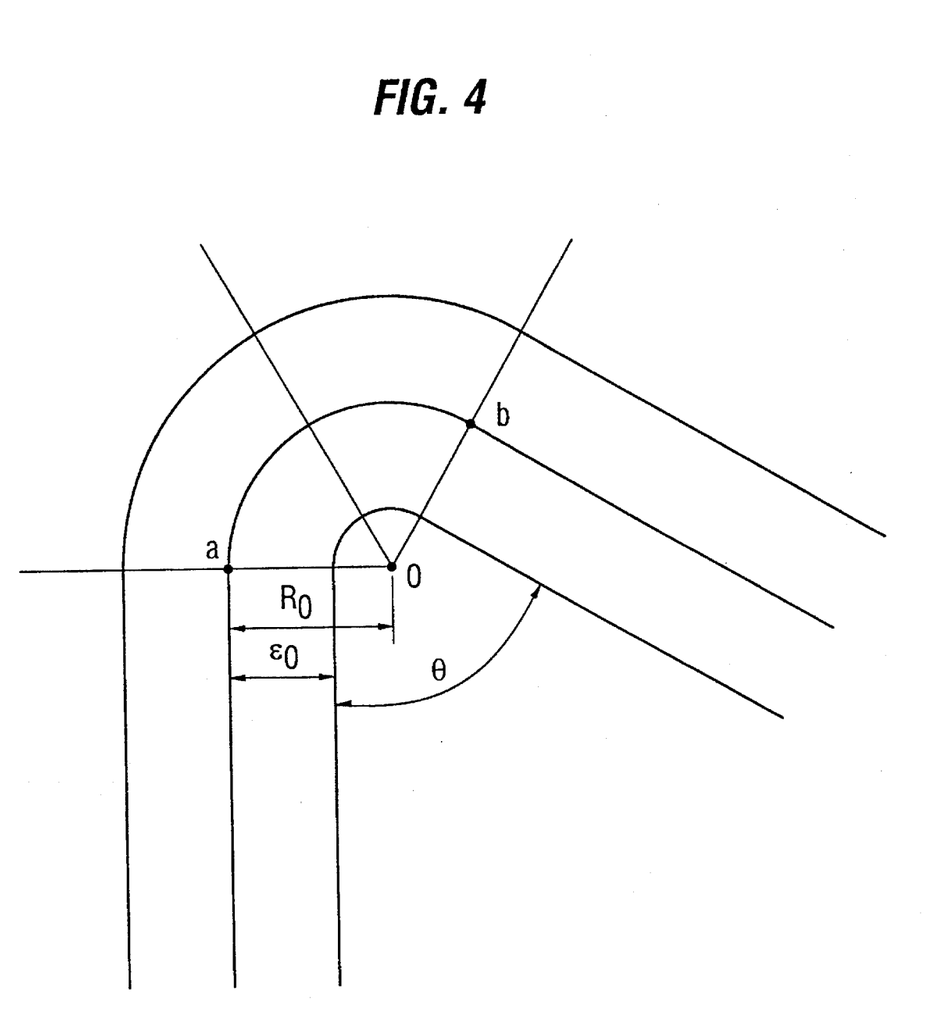
FIG. 4 is a schematic view showing a machined portion including a large-arced corner.

Furthermore, according to the present invention, where the corner includes an arched portion, the region to be specified and the condition for controlling the discharge within the specified region (supply rate and/or supply pressure of the machining fluid and the amount of discharge to be reduced) is varied depending on whether $R_0$, the arc radius of the locus of the width of the machining, is equal to or smaller than $\epsilon_0$, ½ of the width of the machining slit as shown in FIG. 3 (the case of small arc) or larger than $\epsilon_0$ as shown in FIG. 4 (the case of large arc). This is necessary because $\delta$, the degree of discrepancy of the machined workpiece, is substantially independent of $R_0$, the magnitude of arc radius, within the range of $0 \leq R_0 \leq \epsilon_0$; however, it varies depending on $R_0$, the magnitude of arc radius, within the range of $R_0 > \epsilon_0$.

In the case of a corner including an arc of small radius as shown in FIG. 3, where the arc as the locus of the center of wire electrode (center of arc is given as 0) is given as ab; the intersecting point of a perpendicular drawn from an inner edge e of the machining slit and a straight line continuously extending from the arc section ab is given as c; and the point at a distance of $\epsilon_0$ from the point c on the straight line is given as d, the specific section is specified by the arc ab and the straight line bd (=bc+cd). Where an angle formed between two straight lines continuously extending from both edges of the arc section ab is given as θ[rad] (hereinafter, this angle is referred to as a corner angle θ), the central angle aob of the arc is equal to an angle obtained by subtracting the corner angle θ from π[rad], so that the distance bc is expressed by the following equation:

bc=$(\epsilon_0-R_0)$ tan $\{(\pi-\theta)/2\}$

Thus, in the corner machining operation including a small arced corner as shown in FIG. 3, the section to be specified is designated as a section including arc ab and point d (point apart by straight distance L from the terminating point b of arc ab). The distance L is expressed by the following equations.

$$\begin{aligned} L &= bd \\ &= bc + cd \\ &= \epsilon_0 + (\epsilon_0 - R_0) \tan\{(\pi - \theta)/2\} \end{aligned}$$

By the way, as the corner angle θ is equal to an angle obtained by subtracting the central angle aob of the arc from π[rad], the corner angle θ can be determined if the central angle aob of the arc is fixed.

If a corner has a small arc-shape, an allowable amount of deflection of the wire electrode is calculated on the bases of the corner angle θ and a predetermined allowable discrepancy amount δ'. Then, the electric discharge condition is controlled in the specified region in such a manner that a curvature of the wire electrode can be suppressed within the calculated allowable amount of deflection.

When a corner has a large arc-shaped portion to be machined as shown in FIG. 4, the specified region is designated to be identical with the arc section ab. That is, no straight-line section is included in the specified region unlike the case of the small arc corner described above.

In this case, the allowable deflection amount of the wire electrode is calculated on the bases of the predetermined allowable discrepancy amount δ', the corner angle θ, and the arc radius $R_0$. Then, the electric discharge condition is controlled in the specified region in such manner that, a deflection of the wire electrode can be suppressed within the allowable deflection amount.

Figure 5:
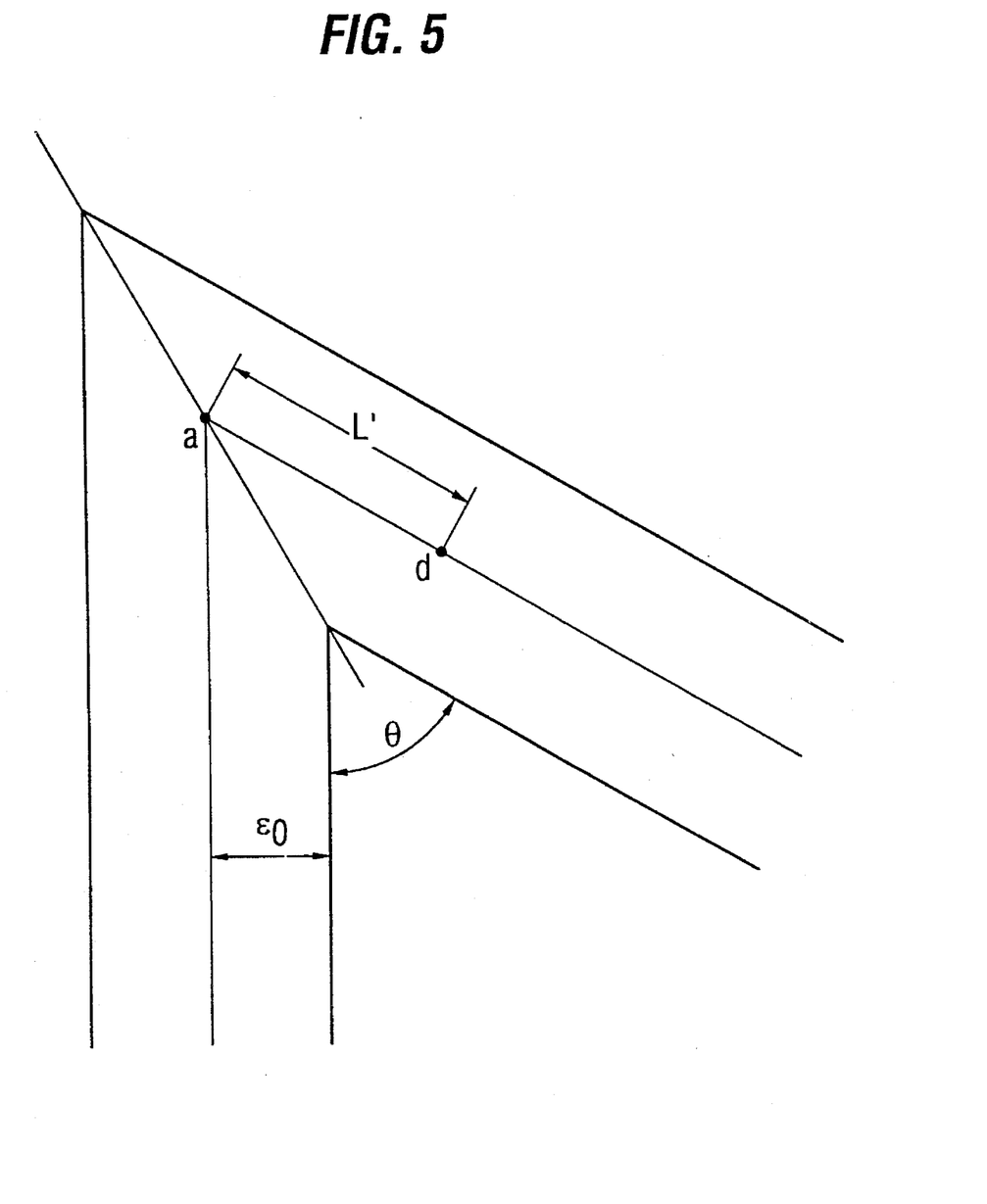
FIG. 5 is a schematic view showing a machined portion including a straight-line portion followed by another straight-line portion.

When a straight-line portion to be machined has a corner followed by another straight line portion to be machined extending in a different direction as shown in FIG. 5, this corner is regarded as a small arc having an arc radius $R_0=0$ at an intersecting point a of two straight lines. Thus, the specified region and the electric discharge condition in this specified region are determined in the same manner as the case of small arc corner as previously described. That is, in FIG. 5, given that the corner angle, i.e. an intersecting angle of above two straight lines is θ, a power-down distance is designated to be a distance L' between the point a and the point d.

This distance L' can be obtained by substituting 0 for $R_0$ in the equation L=$\epsilon_0+(\epsilon_0-R_0)$ tan $\{(\pi-\theta)/2\}$. That is, L'=$\epsilon_0+\epsilon_0$ tan $\{(\pi-\theta)/2\}$.

In this case, the allowable deflection amount of the wire electrode is calculated on the bases of the predetermined allowable discrepancy amount δ' and the corner angle θ so that the electric discharge condition can be controlled in the specified region in such a manner that a curvature of the wire electrode can be suppressed within the calculated allowable deflection amount.

Figure 7:
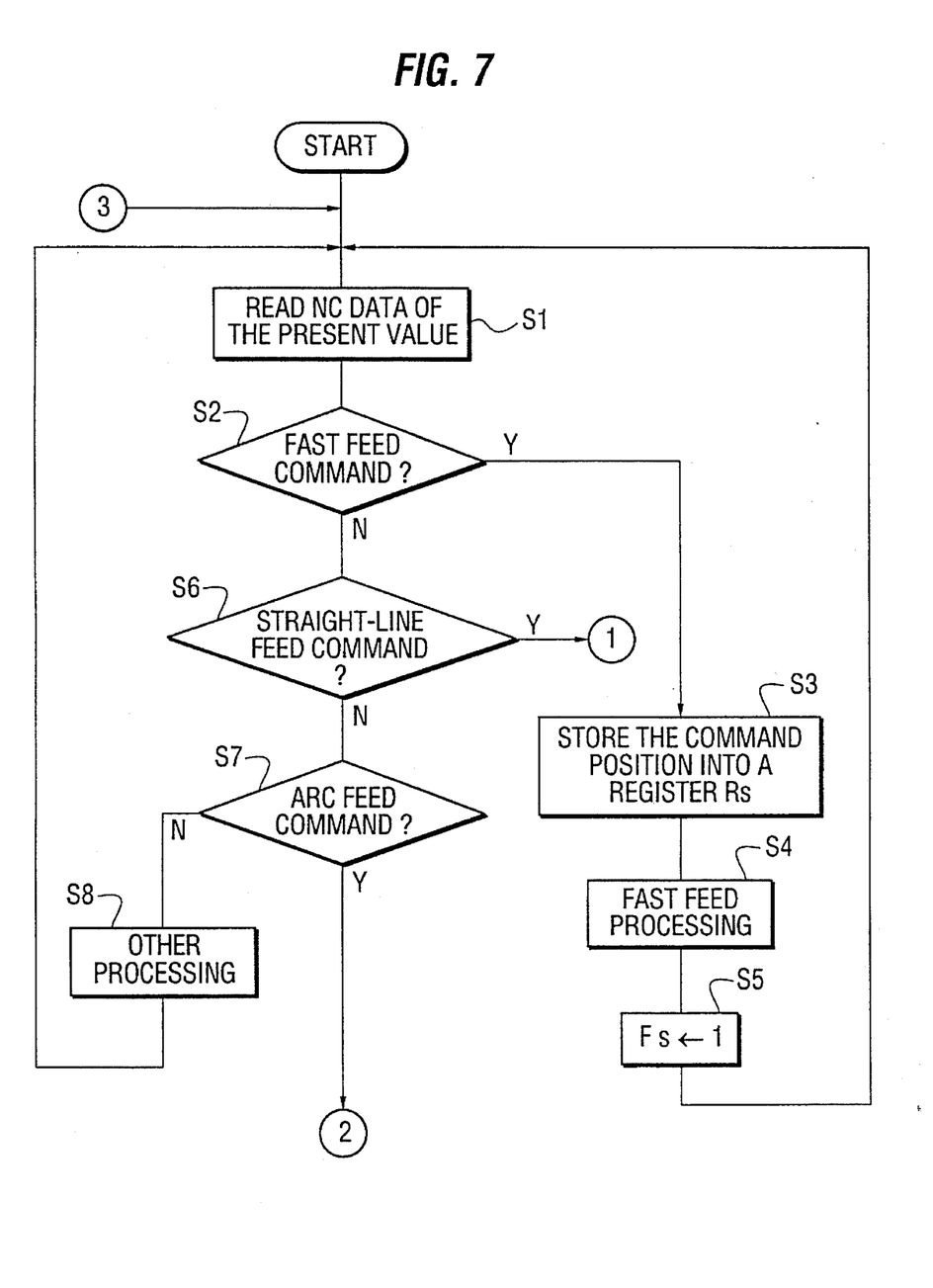
FIG. 7 is a flowchart showing a part of the processing executed by a CPU of the NC apparatus in accordance with the method of the present invention.
Figure 8:
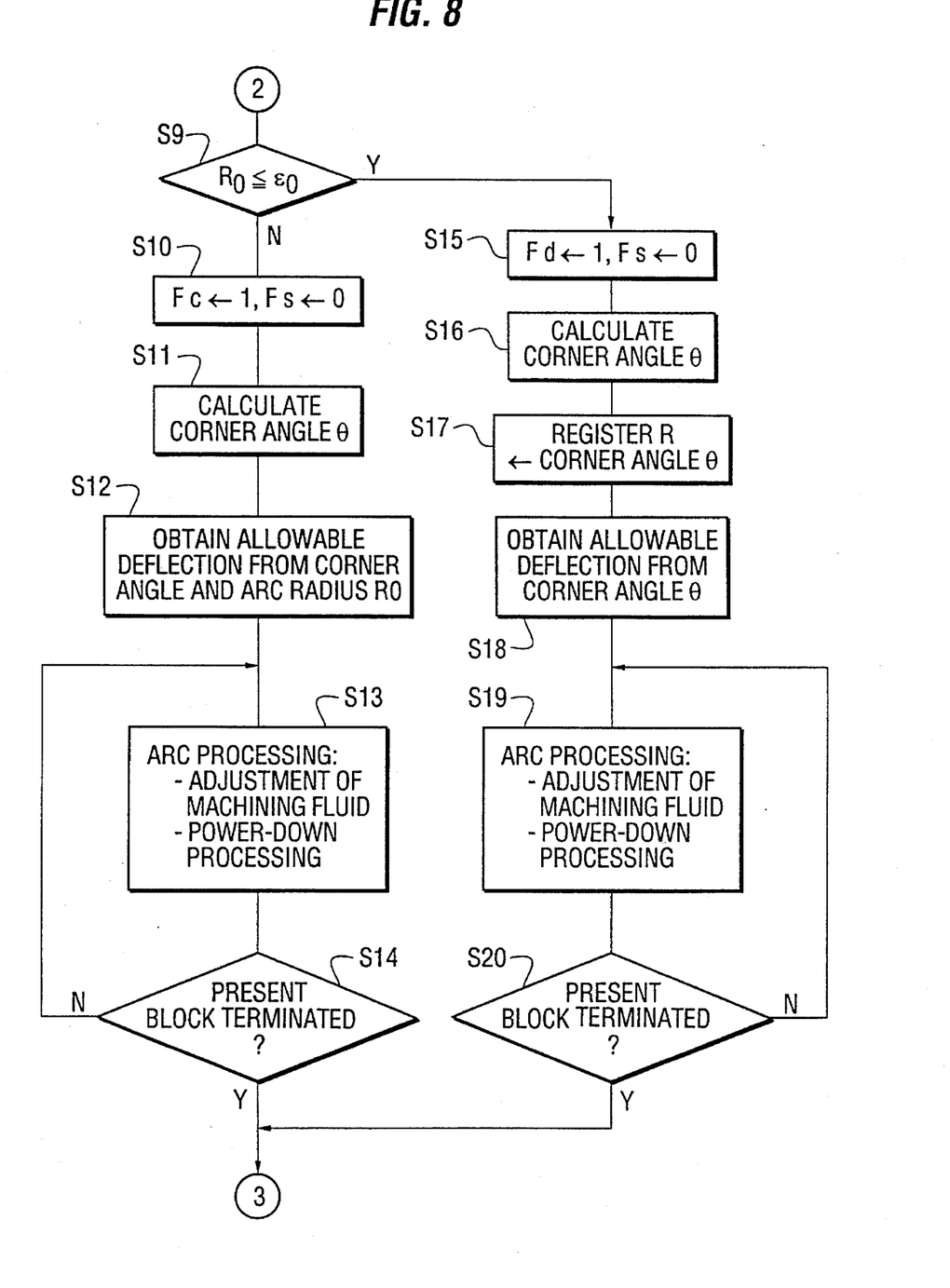
FIG. 8 is a flowchart showing another part of the flowchart of FIG. 7.
Figure 9:
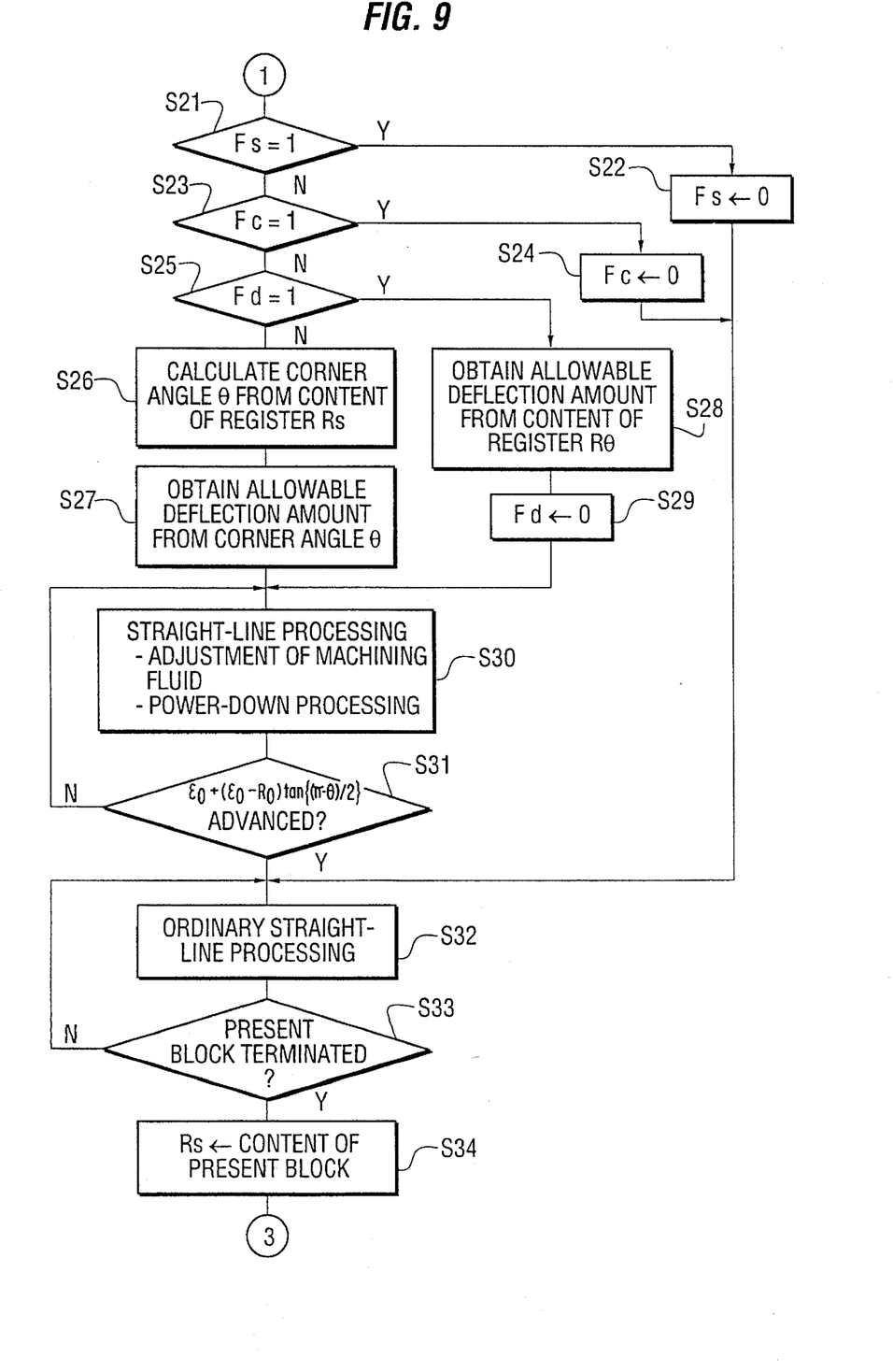
FIG. 9 is a flowchart showing still another part of the flowchart of FIG. 7.

Next, a control method for the wire-cut electric discharge machine as an embodiment of the present invention, executed by the CPU 10 of the NC control apparatus of FIG. 6, will be explained with reference to the flowcharts of FIGS. 7, 8 and 9. By the way, before starting the procedure, the half width $\epsilon_0$ of the machined slit can be obtained, by adding a radius φ/2 of a wire electrode to be used and an estimated machining gap $\delta_0$ (That is, $\epsilon_0=\phi/2+\delta_0$). These data are stored in the RAM 14 through the MDI 12 in advance. Furthermore, flags Fc, Fs and Fd are all initialized to "0".

First, in step S1, the tape reader 11 reads a machining command of the present block from the NC tape 20. Then, in step S2, the CPU 10 makes a judgement as to whether or not the machining command of the present block is a fast feed command. If the machining command is a fast feed command, the CPU 10 proceeds to step S3 to store the command value of the present block in a register Rs. Then, in step S4, the fast feed processing is executed and, subsequently, in step S5, the flag Fs is set to "1". Here, flag Fs=1 means that the fast feed command has already been executed. Then, the processing returns to the step S1.

When the read machining command is not a fast feed command, the processing proceeds to step S6 to make a judgement as to whether or not the machining command of the present block is a straight-line feed command. If the machining command is not the straight-line feed command, the processing proceeds to step S6 to further make a judgement as to whether or not the machining command of the present block is an arc feed command. If the machining command is not the arc feed command, the processing proceeds to step S8 to execute other processing, and then returns to the step S1. By the way, in a case where the above other processing includes a termination command, the processing for the present block will be terminated without returning to the step S1.

When the machining command of the present block is an arc feed command, the processing proceeds from the step S7 to step S9 wherein the arc radius $R_0$ and the distance $\epsilon_0$ are compared to judge whether an arc shape of the present block is a large arc ($R_0 > \epsilon_0$) or a small arc ($R_0 \leq \epsilon_0$).

If the present arc is a large arc ($R_0 > \epsilon_0$), the processing proceeds to step S10 to set the flag Fc to "1", and reset the flag Fs to "0". Then, the corner angle θ of the large arc is determined in step 11. As the corner angle θ is equal to an angle obtained by subtracting the central angle of arc (the angle aob shown in FIG. 4) from π[rad], the corner angle θ can be obtained from the central angle of arc included in the present machining command data.

After determining the corner angle θ of the large arc, the processing proceeds to step S12 to obtain the allowable deflection amount of the wire electrode corresponding to the allowable discrepancy amount δ' on the bases of the corner angle θ and the arc radius $R_0$. In this case, the allowable discrepancy amount δ' is predetermined taking account of the finishing conditions required to be met by the machine. Subsequently, in step S13, the degrees to which supply amount and/or supply pressure of the machining fluid are controlled on the bases of the allowable deflection amount obtained in the step S12 and the power reduction amount on the bases of the allowable deflection amount obtained in the step S12, are controlled. Then, the machining operation is carried out conforming to these conditions.

That is, during the machining operation covering the whole of the arc section between the point a and the point b shown in FIG. 4, not only in the electric power of the wire electrode reduced corresponding to the allowable deflection, but also the supply amount and/or supply pressure of machining fluid is controlled so that the wire electrode will not deflect exceeding the allowable deflection. Then, the processing proceeds to step S14 to make a judgement as to whether or not the present block has terminated. If the judgement in the step S14 is YES, the processing returns to the step S1.

In the step S9, if the present arc is judged to be a small arc ($R_0 \leq \epsilon_0$), the processing proceeds to step S15 to set the flag Fd to "1"; after resetting the flag Fs to "0", the processing proceeds to step S16 to calculate the corner angle θ of this small arc in the same manner as the large arc. That is, the corner angle θ is obtained after obtaining the central angle of the arc included in the present machining command data.

After calculating the corner angle θ of the small arc, the processing proceeds to step S17 to store the value of the corner angle θ in a register $R_θ$. Then, the processing proceeds to step S18 to obtain the allowable deflection amount of the wire electrode corresponding to the allowable discrepancy amount δ' on the bases of the corner angle θ. That is, in the above calculation of the allowable deflection, the arc radius $R_0$ of the small arc is not used.

In step S19, the degrees to which supply amount and/or supply pressure of the machining fluid are to be controlled are determined and the amount of power reduction is determined on the bases of the allowable deflection obtained in the step S18. Then, the arc machining operation is carried out conforming to these conditions.

That is, the electric power of the wire electrode is reduced during the machining covering the whole of the arc section between the point a and the point b in FIG. 3, and also the supply amount and/or supply pressure of the machining fluid are adjusted in accordance with the allowable deflection amount so that the deflection of the wire electrode will not exceed the allowable deflection amount. When the present block is judged to have been finished in step S20, the processing returns to the step S1.

In the step S6, if the machining command of the present block is judged to be a straight-line command, the processing proceeds to step S21 to judge the value of the flag Fs. If the value of the flag Fs is "1", it is concluded that the machining command in the preceding processing was a fast feed command, and the present straight-line machining processing follows this fast feed command. Thus, the processing proceeds to step S22 to reset the flag Fs to "0", and proceeds to step S32 to execute an ordinary straight-line machining processing. That is, the processing for power reduction and processing for adjustment of the machining fluid will not take place. When the present block is judged to have been terminated, the processing proceeds to step S34 to store the command of the present block in the register Rs, and returns to the step S1.

On the other hand, when the flag Fs is "0" in the step S21 (i.e. when at least one arc or straight-line machining processing has already been performed), the processing proceeds to step S23 to make a judgement as to whether or not the value of the flag Fc is "1". If the value of the flag Fc is "1", it is concluded that the straight-line portion to be machined of the present block follows the large arc-shaped section of the previous block. Then, after resetting the flag Fc to "0" first, the processing proceeds to the step S32 to execute the ordinary straight-line machining processing. Then, in the step S33, when the present block is judged to have been terminated, the processing proceeds to the step S34 to store the command of the present block in the register Rs, and returns to the step S1.

When the flags Fs and Fc are "0", while the flag Fd is "1", i.e. when the straight-line portion to be machined of the present block is a machining block following another straight-line portion to be machined, the processing proceeds from step S25 to step S26 to calculate the corner angle θ with reference to the command position of the preceding block stored in the register Rs. For instance, the corner angle θ is obtained on the bases of the advancing directions of two straight lines of the preceding and present blocks. After obtaining the corner angle θ, the processing proceeds to step 27 to further obtain an allowable deflection amount of the wire electrode corresponding to the allowable discrepancy amount δ' on the bases of the corner angle θ.

Next, in step S30, not only the degrees to which supply amount and/or supply pressure of the machining fluid are determined but also the amount of power reduction is determined on the bases of the allowable deflection amount obtained in the step S27. Then, the machining operation is carried out conforming to these conditions.

The electric power of the wire electrode is reduced during the straight-line section between an initiating point of the present straight line machining and a point at a distance L' (L' is obtained by applying $R_0=0$ in obtaining L). More particularly, during the machining of the section between the points a and d of FIG. 5, not only the amount of the power reduction is adjusted corresponding to the allowable deflection amount but also the supply amount and/or supply pressure of the machining fluid is adjusted in accordance with the allowable deflection amount so that the deflection of the wire electrode will not exceed the allowable deflection amount. When the progress of the machining is judged to have passed the specified section in step S31, the processing proceeds to step S32 for resuming the ordinary (straight-line) machining operation. Then, when the present block is judged to have been terminated in step S33, the processing proceeds to the step S34 to store the command of the present block in the register Rs, and returns to the step S1.

When the flags Fs and Fc are "0", and the flag Fd is "1", i.e. when the straight-line portion to be machined of the present block is a straight-line machining block following a small arc-shaped portion to be machined, the CPU 10 proceeds from step S25 to step S28 to obtain the allowable deflection amount in reference to the content (the corner angle θ) of the register $R_θ$ which has been obtained and stored during the processing of small-arced portion in the preceding block. Then, the processing proceeds to step S29 to reset the flag Fd to "0". In step S30, not only the degrees of control for supply amount and/or supply pressure of the machining fluid are determined on the bases of the allowable deflection but also the amount of power reduction is determined. Then, the machining operation for the present block is carried out conforming to these conditions.

The electric power of the wire electrode and the machining fluid are reduced during the straight-line portion to be machined between an initiating point of the present straight line and a point apart a distance $L=\epsilon_0+(\epsilon_0-R_0) \tan\{(\pi-\theta)/2\}$. To make a judgement when the wire electrode is judged to have passed the predetermined distance corresponding to the designated power-down section. If the judgement in the step S31, the processing proceeds to the step S32 to execute the ordinary straight-line machining operation. Then, in the step S33, when the present block is judged to have been terminated, processing proceeds to the step S34 to store the command of the present block in the register Rs, and returns to the step S1.

By controlling the machine in the above-described manner, the deflection of the wire electrode occurring due to the supply of the machining fluid at the corner section and the resulting corner discrepancy can be prevented to improve the machining accuracy.

In the above embodiment, both the power reduction processing and the processing for adjusting the machining fluid supply are executed in parallel. However, greater emphasis may be placed on the adjustment of the machining fluid supply than the power reduction to reduce the deflection the wire electrode during the machining of the corner portion. Further, the power down processing may be omitted so that the deflection of the wire electrode is reduced only by adjusting the supply of the machining fluid. The supply of the machining fluid can be adjusted by adjusting either the supply pressure or supply rate, or by adjusting both.

Furthermore, in the above embodiment, a section between a machining initiation position and a position at a distance of $L=\epsilon_0+(\epsilon_0-R_0)\tan\{(\pi-\theta)/2\}$ is designated as a machining fluid adjusting section on the straight-line portion to be machined following the small-arc portion to be machined (FIG. 3) or on the straight-line portion to be machined following another straight-line portion to be machined (FIG. 5). This machining fluid adjusting section is, however, not limited to the above-described region. For example, the terminal point of this machining fluid adjusting section can be further extended.

We claim:

1. A method of controlling a wire-cut electric discharge machine for machining a workpiece into a desired shape by generating an electric discharge between a wire electrode and the workpiece while supplying a machining fluid to a gap between the wire electrode and the workpiece, said method comprising the steps of:

designating a specified section including an arc section and a straight-line section following said arc section when a portion of said workpiece to be machined is a corner including said arc section; and controlling a pressure or an amount of said machining fluid only to said specified section to levels lower than those of a straight-line machining operation so that a deflection amount of the wire electrode is suppressed to a predetermined value or lower while the wire electrode is moving within said specified section.

2. A method of controlling a wire-cut electric discharge machine in accordance with claim 1, wherein said specified section comprises said arc section and said straight-line section ranging from a terminating point of said arc section to a point at a distance L represented by the following equation:

$L=\epsilon_0+(\epsilon_0-R_0)\tan\{(\pi-\Theta))/2\}$ in the case where a radius $R_0$ of said arc section is within a range of $0\leq R_0 \leq \epsilon_0$, wherein the radius $R_0$ corresponds to a trace of a center of the wire electrode, and $\epsilon_0$ represents a half width of a machined slit.

3. A method of controlling a wire-cut electric discharge machine for machining a workpiece into a desired shape by generating an electric discharge between a wire electrode and the workpiece while supplying a machining fluid to a gap between the wire electrode and the workpiece, said method comprising the steps of:

designating a specified section including an intersecting point of two straight lines and a straight-line section following said intersecting point to at least a point at which a machining slit is that of a straight-line machining operation; and controlling a pressure or an amount of said machining fluid only to said specified section to levels lower than those of said straight-line machining operation so that a deflection amount of the wire electrode is suppressed to or below a predetermined value while the wire electrode is moving in said specified section.

4. A method of controlling a wire-cut electric discharge machine in accordance with claim 3, wherein said specified section comprises a section ranging from an intersecting point of said two straight lines to a point at a distance L' represented by the following equation:

$L'=\epsilon_0+\epsilon_0\tan\{(\pi-\Theta/2\}$, wherein $\epsilon_0$ represents a half width of a machined slit.

5. A method of controlling a wire-cut electric discharge machine for machining a workpiece into a desired shape by generating an electric discharge between a wire electrode and the workpiece while supplying a machining fluid to a gap between the wire electrode and the workpiece, said method comprising the steps of:

designating a specified section including an arc section and a straight-line section following said arc section when a portion of said workpiece to be machined is a corner including said arc section; and controlling a pressure or an amount of said machining fluid only to said specified section and controlling an electric discharge energy supplied between the wire electrode and the workpiece only to said specified section to respective levels lower than those in a straight-line machining operation, so that a deflection amount of the wire electrode is suppressed to or below a predetermined value when the wire electrode is moving within said specified section.

6. A method of controlling a wire-cut electric discharge machine in accordance with claim 5, wherein said specified section comprises said arc section and said straight-line section ranging from a terminating point of said arc section to a point at a distance L represented by the following equation:

$L=\epsilon_0+(\epsilon_0-R_0)\tan\{(\pi-\Theta)/2\}$ in the case where a radius $R_0$ of said arc section is in a range of $0\leq R_0\leq\epsilon_0$, wherein the radius $R_0$ is a trace of a center of the wire electrode, and $\epsilon_0$ represents a half width of a machined slit.

7. A method of controlling a wire-cut electric discharge machine for machining a workpiece into a desired shape by generating an electric discharge between a wire electrode and the workpiece while supplying a machining fluid to a gap between the wire electrode and the workpiece, said method comprising the steps of:

designating a specified section including an intersecting point of two straight lines and a straight-line section following said intersecting point to at least a point at which a machining slit is that of a straight-line machining operation; and controlling a pressure or an amount of said machining fluid only to said specified section and controlling an electric discharge energy supplied between the wire electrode and the workpiece only to said specified section to respective levels lower than those in said straight-line machining operation, so that a deflection amount of the wire electrode is suppressed to or below a predetermined value while the wire electrode is moving within said specified section.

8. A method of controlling a wire-cut electric discharge machine in accordance with claim 7, wherein said specified section comprises a section ranging from an intersecting point of said two straight lines to a point at a distance L' represented by the following equation:

$L' = \epsilon_0 + \epsilon_0 \tan\{(\pi - \Theta)/2\}$, wherein $\epsilon_0$ represents a half width of a machined slit.

* * * * *

UNITED STATES PATENT AND TRADEMARK OFFICE
CERTIFICATE OF CORRECTION

PATENT NO. :   5,504,294
DATED      :   April 2, 1996
INVENTOR(S):   Syunzo IZUMIYA, et al.

It is certified that error appears in the above-indentified patent and that said Letters Patent is hereby corrected as shown below:

Column 1, line 38, delete "wife" and insert therefor --wire--.

Column 3, line 59, delete "arc-shape" and insert therefor --arc-shaped--.

Column 5, line 29, delete "in", second occurrence, and insert therefor --is--.

Signed and Sealed this

Twenty-fifth Day of June, 1996

Attest:

BRUCE LEHMAN

Attesting Officer            Commissioner of Patents and Trademarks